United States Patent Office 3,536,684
Patented Oct. 27, 1970

3,536,684
COPOLYMERIZATION WITH AZO CATALYST OF 2-PHENYL ALLYL ALCOHOL AND STYRENE AND SOLID COPOLYMERS THEREOF
Joseph A. Verdol, Dolton, and Marc O. Thienot, Park Forest, Ill., assignors to Sinclair Research, Inc., New York, N.Y., a corporation of Delaware
No Drawing. Filed Apr. 4, 1967, Ser. No. 628,282
Int. Cl. C08f 1/76, 21/02
U.S. Cl. 260—88.1
14 Claims

ABSTRACT OF THE DISCLOSURE

Copolymers of styrene and 2-phenyl allyl alcohol are obtained by reacting from approximately 1–50 moles of styrene per mole of 2-phenyl allyl alcohol in the presence of an azo group-containing catalyst. This polymerization reaction may be carried out using various techniques such as suspension, bulk or solution polymerization. Suspension polymerization is an especially efficient method. A solid copolymer having a ratio of 2 to 1 moles of styrene per mole of 2-phenyl allyl alcohol is especially obtained.

This invention relates to a method of copolymerizing styrene and 2-phenyl allyl alcohol. In a particular aspect, it relates to the use of an azo group-containing catalyst in the copolymerization of styrene and 2-phenyl allyl alcohol.

Polymers of allyl alcohols are, in general, diffcult to prepare. Resinous materials produced by the conjoint polymerization of styrene and 2-phenyl allyl alcohol have been described in the prior art, e.g., in U.S. Pat. 2,563,611 to Mills et al., issued Aug. 7, 1951. The polymerization techniques which have been described as operable for the preparation of this copolymer have been limited, however, to mass and aqueous emulsion polymerization systems. Furthermore, the catalysts employed have been limited to a select group of peroxide catalysts, including sodium peroxide, benzoyl peroxide and hydrogen peroxide. Benzoyl peroxide has been disclosed as the preferred catalyst of this group.

The styrene-2-phenyl allyl alcohol copolymers have been of limited interest, however, due to the extremely low yields resulting from the use of the above polymerization techniques. The poor yields, furthermore, are more in evidence as one attempts to prepare copolymers having relatively high concentrations of combined 2-phenyl allyl alcohol. Since, to a great extent, the usefulness of the copolymers lies in their ability to enter into further reactions through their pendant hydroxyl groups, for instance, to cross-link other resin systems containing hydroxyl-reactive functional groups, such as epoxy resins, phenol-formaldehyde resins, urea-formaldehyde resins and the like, the disadvantages of the inability to effectively produce copolymers of high 2-phenyl allyl alcohol-to-styrene ratios are readily apparent. The art has heretofore only been successful in preparing styrene-phenyl allyl alcohol copolymers having a maximum combined phenyl allyl alcohol content of about 30 weight percent. Copolymers of such low hydroxyl concentration are vastly hampered in their ability to react with and modify, e.g., cure hydroxyl-reactive resins such as the epoxy resins.

It has now been found that significantly higher yields of copolymers of styrene and 2-phenyl allyl alcohol may be obtained through the use, as polymerization catalyst, of a minor, effective amount of an azo group-containing compound. In addition, attendant advantages found in the use of an azo catalyst are the ability to prepare copolymers having relatively high ratios of 2-phenyl allyl alcohol-to-styrene, e.g., of about 1:1 to 2:1 molar ratios of combined styrene to 2-phenyl allyl alcohol, equivalent to weight percentages of styrene in the range of 44–61% and of 2-phenyl allyl alcohol in the range of 39–56%. A further advantage of employing an azo-type catalyst is the ability to employ with almost equal effectiveness various polymerization systems, including bulk, solution and suspension polymerizations. The molar ratio of 2-phenyl allyl alcohol monomer to styrene monomer in the reaction mixture can be about 1:1 to 1:2, although approximately 1–50 moles of styrene per mole of 2-phenyl allyl alcohol can be in the reaction mixture.

The azo type catalysts employed in the polymerization of the present invention include the symmetrical azo compounds having an azo group, —N=N—, bonded from each of the nitrogen atoms to tertiary carbon atoms. The azo compounds can be represented by the structure:

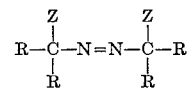

wherein R is an aliphatic, including cycloaliphatic, hydrocarbon of up to about 11 carbon atoms with the total carbon atoms on each side of the azo group being about 4 to 11 and Z is selected from the group consisting of

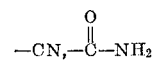

and

wherein R' is lower alkyl, say of 1 to 6 carbon atoms. R and R' in the structural formula may be saturated or unsaturated, straight or branched chain. The preferred catalysts are the alpha, alpha'-azobis alkane-nitriles.

Illustrative of suitable azo type catalysts are alpha, alpha'-azodiisobutyronitrile; alpha, alpha'-azobis (alpha, gamma - dimethylvaleronitrile); alpha, alpha' - azobis (alphamethylbutyronitrile); alpha, alpha'-azobis (alpha-ethylbutyronitrile); alpha, alpha'-azobis (alpha-phenyl-propionitrile); alpha, alpha'-azobis (alpha-cyclopropyl-propionitrile); alpha, alpha'-azobis (alpha-cyclohexylpro-pionitrile); alpha, alpha'-azobis (alpha-cycloheptylpro-pionitrile); alpha, alpha'-azobis (alpha-isopropyl-beta-methylbutyronitrile); alpha, alpha'-azobis (alpha, gamma-dimethyl-capronitrile); alpha, alpha'-azobis- (alpha-n-butyl-capronitrile); alpha, alpha'-azobis (alpha-isobutyl-gamma-methylvaleronitrile); alpha, alpha'-azobis (alpha-methyl-gamma-carboxy-butyronitrile) and its salts, e.g., disodium gamma, gamma'-azobis-(gamma-cyanovaler-ate); 1,1'-azodicyclohexanecarbonitrile; 1,1'-azodicyclo-heptanecarbonitrile; 1,1'-azobis (3-methylcyclopentane-carbonitrile); 1,1'-azobis (2,4-dimethylcyclohexanecar-bonitrile), and the corresponding amides and esters of the above in which the nitrile group or groups are replaced by amide and/or ester groups, e.g., to give alpha, alpha'-azodiisobutyramide; alpha, alpha'-azobis (alpha, gamma-dimethylvaleramide); alpha, alpha'-azobis (alpha-cyclo-propylpropionamide); 1,1' - azodicyclohexane - carbon-amide; N,N'-alpha, alpha'-azodiisobutyrodimethylamide; dimethyl, diethyl and dihexyl-alpha, alpha'-azodiiso-butyrate. The concentration of the catalyst may vary with the temperature selected and with the particular polymerization system, i.e., whether bulk, solution, suspension or emulsion polymerization, but in all cases will be in catalytically effective amounts. Generally, the catalyst concentrations will fall in the range of about 0.1 to 10 percent by weight of the monomeric reactants, preferably about 1 to 5 percent by weight of the monomers.

Polymerization temperatures may be from about 20° C., to about 200° C., while temperatures in the range from 45° C., to 80° C., are preferred.

Copolymers containing a molar ratio of 2-phenyl allyl alcohol (2-PAA) to styrene of from about 1:1 to 1:50 may be prepared by the method of the present invention. Most often the desired ratio of 2-PAA to styrene will be from 1:2 to 1:10. Copolymers of styrene and 2-phenyl allyl alcohol are obtained by reacting from approximately 1–50 moles of styrene per mole of 2-phenyl allyl alcohol in the presence of an azo group-containing catalyst. A solid copolymer having a ratio of 2 to 1 moles of styrene per mole of 2-phenyl allyl alcohol is especially obtained.

As stated previously, various polymerization techniques may be employed successfully with the azo catalyzed system of the present invention. Suspension polymerization, however, has proven to be the most efficient method for producing copolymers of 2-PAA and styrene, as will be evidenced by the examples to follow.

The following examples are drawn to the use of three different polymerization techniques, namely: bulk, solution and aqueous suspension polymerization, for the preparation of 2-PAA-styrene copolymers using the catalyst system of the present invention.

Example I—Bulk polymerization

The bulk copolymerization experiments were carried out in 75 ml. polymerization tubes. Combined monomer charges ranging from 17–50 grams were added, with the appropriate catalyst, to the polymerization tubes which were flushed with nitrogen and sealed. The tubes were heated to the appropriate temperatures for the times shown. When the reaction mixtures were liquid, methanol was added to precipitate the polymers. When solid polymeric products were obtained, they were dissolved in methyl ethyl ketone and subsequently precipitated by the addition of methanol. The products were then dried in vacuo at 100–110° C.

The bulk polymerizations were performed with an azo catalyst according to the method of the present invention, and with a peroxide catalyst, according to the method of the prior art. The former was OC, OC'-azobisisobutyronitrile; the latter, benzoyl peroxide. Conditions and results of the experiments are recorded in Table I, below.

to 2-PAA, solid polymers, melting point circa 126–136° C. and molecular weight of about 4000, were formed. Infrared analysis showed these polymers to contain one 2-PAA unit per 4–5 styrene units.

Azobisisobutyronitrile was much more effective than benzoyl peroxide for bulk copolymerization. At a 1% catalyst level and 1:1 mole ratio of monomers, up to 58% conversion was realized. With 5% of the azo catalyst the conversion increased to 90%. The copolymers formed with azobisisobutyronitrile at the 1:1 monomer ratio were white solids having maximum melting points of 162–178° C. Molecular weights ranged from 1800–2900. Infrared analysis showed the polymers to be 1:1 copolymers (2-PAA:styrene).

At a 1:5 molar ratio of monomers (2-PAA:styrene) with azobisisobutyronitrile catalyst, copolymers of 1:5 molar composition were obtained at near quantitative yield. Using a 1% catalyst concentration the copolymers were solids, melting at 140–162° C., with a molecular weight from 5500 to 6900. Using a 5% catalyst concentration the copolymers were solids with melting point ranges of 118–158° C. and molecular weights of 2800 to 4200. Infrared analysis showed the polymers to be 1:5 copolymers.

EXAMPLE II—Solution polymerization

Solution polymerizations in benzene were conducted in 350-ml. pressure bottles at 10–33% combined monomer concentration. In a typical experiment 26 grams of 2-phenyl allyl alcohol, 41 grams of styrene, 137 grams of benzene and 0.68 grams (1%) azobisisobutyronitrile catalyst were charged to the polymerization bottle. The bottle was flushed with nitrogen, sealed and heated in a launderometer bath at 60° C. for 65 hours.

The products were worked up by partially evaporating the benzene and adding methyl ethyl ketone in an amount just sufficient to redissolved the polymer. Methanol was then employed to precipitate the polymer, which was filtered and dried in vacuo at 100–110° C. to constant weight.

As in the bulk polymerization experiments, the effectiveness of the azo catalyst in solution polymerization was compared with that of the recommended peroxide catalyst of the prior art, benzoyl peroxide.

Conditions and results of the solution copolymerizations are given in Table II.

TABLE I

| Catalyst and concentration, percent | 2-PAA:styrene mole ratio | Percent conversion | Copolymer M.P. °C | Mol. wt. | Reaction conditions | | Molar ratio in copolymer by IR analysis 2-PAA:styrene |
|---|---|---|---|---|---|---|---|
| | | | | | Temp. °C | Time hrs. | |
| Azobisisobutyronitrile, 1 | 1:1 | 41 | 142-150 | 1,800 | 80 | 12 | 1:1 |
| Do | 1:1 | 58 | 162-178 | 2,425 | 60 | 65 | |
| Azobisisobutyronitrile, 5 | 1:1 | 44.5 | 148-154 | 2,500 | 80 | 12 | 1:1 |
| Do | 1:1 | 90 | 161-167 | 2,906 | 60 | 65 | |
| Azobisisobutyronitrile, 1 | 1:5 | 80 | 129-140 | 6,900 | 80 | 12 | Ca. 1:4 |
| Do | 1:5 | 94 | 140-162 | 5,505 | 60 | 65 | |
| Azobisisobutyronitrile, 5 | 1:5 | 72 | 118-125 | 2,801 | 80 | 12 | Ca. 1:4 |
| Do | 1:5 | 97 | 138-158 | 4,216 | 60 | 65 | |
| Benzoyl peroxide, 1 | 1:1 | 7.3 | | | 80 | 12 | 1:1 |
| Benzoyl peroxide, 5 | 1:1 | 8.5 | 168-186 | 4,800 | 80 | 12 | 1:1 |
| Benzoyl peroxide, 1 | 1:5 | 49 | 131-136 | 4,400 | 80 | 12 | Ca. 1:5 |
| Benzoyl peroxide, 5 | 1:5 | 68 | 126-132 | 3,600 | 80 | 12 | Ca. 1:5 |

The results of the bulk polymerization experiments, illustrated in Table I, demonstrate that with 1% benzoyl peroxide at a 1:1 molar ratio of 2-PAA to styrene, 7.3% conversion of total monomers to solid polymer occurred. At 5% benzoyl peroxide concentration, the conversion was 8.5%. Infrared analysis showed the copolymers to be 1:1 (mole ratio) copolymers. The 1:1 copolymers with benzoyl peroxide had molecular weights of about 4800.

With benzoyl peroxide at a 5:1 molar ratio of styrene

The results of the solution polymerization experiments, as reported in Table II, are evidence of the effectiveness of the azo type catalysts for the copolymerization of 2-PAA and styrene while in solution, and convincingly show the inferiority of benzoyl peroxide as a catalyst for this method of polymerization. The copolymers produced with the azo catalysts were solids melting above 100° C., and their compositions (monomer ratios), conformed closely to the composition of the monomers charged. Polymerization reactions conducted in benzene at 60° C., gave higher conversions than reactions conducted at 80° C.

tion of the monomer ratios and catalyst concentrations used.

TABLE II

| Catalyst and concentration, percent | 2-PAA:styrene, mole ratio | Percent conversion | Copolymer M.P.,° C. | Mol. wt. | Reaction conditions | | Molar ratio in copolymer by IR analysis, 2-PAA:styrene |
|---|---|---|---|---|---|---|---|
| | | | | | Temp.,° C. | Time, hrs. | |
| Azobisisobutyronitrile, 1 | 1:1 | 8 | | | 80 | 12 | 1:1 |
| Do | 1:1 | 70 | 141–164 | 1,914 | 60 | 65 | 1:1 |
| Azobisisobutyronitrile, 5 | 1:1 | 72 | 127–148 | 1,467 | 60 | 65 | 1:1 |
| Do | 1:1 | 13 | | | 80 | 12 | 1:1 |
| Azobisisobutyronitrile, 1 | 1:2 | 56 | 136–152 | 2,207 | 60 | 65 | 1:2 |
| Azobisisobutyronitrile, 5 | 1:2 | 82 | 137–148 | 2,235 | 60 | 65 | 1:2 |
| Do | 1:2 | 61 | 122–134 | 1,852 | 60 | 65 | 1:2 |
| Do | 1:2 | 64 | 118–130 | 1,816 | 60 | 65 | 1:2 |
| Azobisisobutyronitrile, 1 | 1:3 | 46 | 109–127 | 2,050 | 60 | 12 | 1:2–1:3 |
| Azobisisobutyronitrile, 5 | 1:3 | 62 | 110–124 | 1,830 | 80 | 12 | 1:2–1:3 |
| Azobisisobutyronitrile, 1 | 1:5 | 43 | 129–139 | 3,937 | 80 | 12 | 1:5 |
| Azobisisobutyronitrile, 5 | 1:5 | 18 | 124–132 | 2,788 | 80 | 12 | 1:5 |
| Benzoyl peroxide, 0.5 | 1:1 | 4 | | | 60 | 60 | |
| Benzoyl peroxide, 1 | 1:1 | 4.5 | | | 60 | 60 | |

EXAMPLE III—Suspension polymerization

Suspension polymerization experiments shown in Table III were carried out in 350-ml. pressure bottles at 33% monomer concentration using 3% polyvinyl alcohol (based on monomer weight) as the suspending agent. In a typical experiment, a combined monomer charge of 50 grams of styrene and 60 grams of 2-phenyl allyl alcohol was added to the pressure bottle containing 136 grams of distilled water, about 2 grams of polyvinyl alcohol suspending agent and the appropriate amount of catalyst. The pressure bottle was flushed with nitrogen, sealed and placed in a rotating launderometer bath at 60° C., for 65 hours.

Azobisisobutyronitrile provide to be superior to the peroxide catalyst in the bulk and solution polymerization experiments. Suspension polymerization is, in reality, a form of bulk polymerization. In suspension polymerization a protective colloid is employed to promote dispersion of the liquid monomer into tiny droplets. Each droplet is then polymerized to form a solid polymeric particle. Since the polymerization occurs in the droplet, it is advantageous to employ a catalyst which is soluble in the monomers being polymerized. The azobisisobutyronitrile catalyst was very soluble in the monomers and had the advantage of not being readily susceptible to radical-induced decomposition.

Table III summarizes in detail the results of several copolymerization experiments at varying mole ratios of 2-PAA to styrene, e.g., 1:1, 1:2, 1:3, 1:4 and 1:5. These experiments were conducted at 60° C., and at 33% monomer concentration in water.

In most cases the polymers were isolated in the form of white microbeads, which were easily dried in a vacuum oven. The polymers produced by suspension polymerization were unquestionably more easily handled and dried then polymers prepared in bulk or non-aqueous solution.

The effect of the presence of 2-phenyl allyl chloride as an impurity during the copolymerization of styrene and 2-phenyl allyl alcohol was also studied. In these experiments 5% and 10% of 2-phenyl allyl chloride (2-PAC) were added to 1:2 mixtures of 2-phenyl allyl alcohol and styrene. Chlorine analysis showed that the majority of 2-PAC impurity was incorporated in the polymer. Although no great reduction in conversion was noticed, a product slightly lower in molecular weight was obtained when 2-PAC was present in the reaction. The copolymers prepared in the presence of 2-phenyl allyl chloride darkened more upon heating than copolymers prepared without the chloride impurity.

From the foregoing examples it is apparent that the use of an azo group-containing catalyst for the copolymerization of styrene and 2-phenyl allyl alcohol produces consistently higher yields of copolymer, regardless of the polymerization system employed, than that produced by benzoyl peroxide-catalyzed polymerization, the latter being the method preferred by the prior art. In addition, by employing the polymerization technique of the instant invention, copolymers having higher hydroxyl concentration than heretofore attained, i.e., having a combined molar ratio of styrene to 2-phenyl allyl alcohol in the range of 1:1 to 2:1, may be prepared; and such copolymers exhibit greatly enhanced reactivity with the afore-

TABLE III

| Catalyst and concentration, percent | 2-PAA:styrene, mole ratio | Percent conversion | Copolymer M.P.,° C. | Mol. wt. | Reaction conditions | | Molar ratio in copolymer by IR analysis, 2-PAA:styrene |
|---|---|---|---|---|---|---|---|
| | | | | | Temp.,° C. | Time, hrs. | |
| Azobisisobutyronitrile, 1 | 1:1 | 61 | 89–104 | 540 | 60 | 65 | 1:1 |
| Azobisisobutyronitrile, 5 | 1:1 | 98 | 155–157 | 1,443 | 60 | 65 | 1:1 |
| Azobisisobutyronitrile, 1 | 1:2 | 79 | 111–155 | 1,222 | 60 | 65 | 1:2 |
| Azobisisobutyronitrile, 5 | 1:2 | 99 | 117–158 | 1,910 | 60 | 65 | 1:2 |
| Azobisisobutyronitrile, 1 | 1:3 | 94 | 126–156 | 5,016 | 60 | 65 | 1:3 |
| Azobisisobutyronitrile, 5 | 1:3 | 99 | 129–154 | 2,339 | 60 | 65 | 1:3 |
| Azobisisobutyronitrile, 1 | 1:5 | 96 | 125–158 | 4,571 | 60 | 65 | 1:5 |
| Azobisisobutyronitrile, 5 | 1:5 | 95 | 112–144 | 2,545 | 60 | 65 | 1:5 |
| Do | [1]1:2 | 99 | 109–146 | 1,688 | 60 | 65 | 1:3 |
| Do | [2]1:2 | 99 | 115–149 | 1,840 | 60 | 65 | 1:3 |

[1] Addition of 5% of 2-phenyl allyl chloride.
[2] Addition of 10% of 2-phenyl allyl chloride.

As evidenced by Table III in comparison with data in the other examples, suspension polymerization proved, by far, to be the most efficient method for producing copolymers of 2-PAA and styrene. Conversion of monomers to polymer generally exceeded 90%. A complete family of copolymers varying in mole ratio from 1:1 to 1:5 was prepared at molecular weights ranging from 540 to 6757. The molecular weights were found to be a funcmentioned hydroxyl-reactive resins, enabling them to effectively modify such resins, whereas copolymers heretofore prepared by the prior art peroxide-catalyzed copolymerization have been comparatively ineffective.

When employing azo-catalyzed solution, suspension or emulsion polymerization systems, appropriate solvents, reaction vessels, emulsion and suspension aids, solvent-monomer ratios, etc., may be selected in accordance with It is claimed:

1. In the copolymerization of styrene and 2-phenyl allyl alcohol, the improvement which comprises the use as the copolymerization catalyst of a minor, effective amount of an azo catalyst in contact with a reaction mixture of from about 1:1 to 1:50 molar ratio of 2-phenyl allyl alcohol to styrene in bulk, solution or aqueous suspension at a temperature of about 20° to about 200° C.

2. The process of claim 1 wherein the azo catalyst is present in the reaction medium in an amount from about 0.1 to 10 percent by weight of the styrene and 2-phenyl allyl alcohol.

3. The process of claim 2 wherein the copolymerization is carried out in an aqueous suspension.

4. The process of claim 2 wherein the copolymerization is conducted at temperatures of from 45° C. to 80° C.

5. The process of claim 1 wherein the azo group-containing compound has the structure:

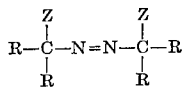

wherein R is an aliphatic hydrocarbon of up to about 11 carbon atoms with the total carbon atoms on each side of the azo group being about 4 to 11, and Z is selected from

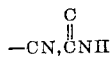

and

wherein R' is lower alkyl.

6. The method of claim 5 wherein R is alkyl and Z is —CN.

7. The method of claim 1 wherein the catalyst is alpha, alpha'-azobisisobutyronitrile.

8. In the copolymerization of styrene and 2-phenyl allyl alcohol wherein the molar ratio of 2-phenyl allyl alcohol monomer to styrene monomer in the reaction mixture is from about 1:1 to 1:50, the improvement which comprises conducting said copolymerization in an aqueous suspension at temperatures from about 20° C., to about 200° C., in the presence of a catalytic amount of alpha, alpha'-azobisisobutyronitrile.

9. The process of claim 8 wherein the molar ratio of 2-phenyl allyl alcohol monomer to styrene monomer is about 1:1 to 1:2.

10. The process of claim 1 wherein the molar ratio of 2-phenyl allyl alcohol monomer to styrene monomer is about 1:1 to 1:2.

11. A process for preparing copolymers of 2-phenyl allyl alcohol and styrene which comprises polymerizing the monomers 2-phenyl allyl alcohol and styrene in molar ratios of about 1:1 to 1:2 in bulk, solution or aqueous suspension at a temperature of 45° C. to 80° C. in the presence of from about 1 to 5% of an azo catalyst based on said monomers and obtaining as the resulting product a solid copolymer of 2-phenyl allyl alcohol and styrene having a molar ratio of 2-phenyl allyl alcohol to styrene of about 1:1 to 1:2.

12. A process for preparing copolymers of 2-phenyl allyl alcohol and styrene as set forth in claim 11 wherein said azo catalyst is alpha, alpha'-azobisisobutyronitrile.

13. A process for preparing copolymers of 2-phenyl allyl alcohol and styrene as set forth in claim 11 wherein the monomers 2-phenyl allyl alcohol and styrene are in molar ratio of about 1:1 and the resulting product is a polid copolymer of 2-phenyl allyl alcohol and styrene having a molar ratio of 2-phenyl allyl alcohol to styrene of about 1:1.

14. A process for preparing copolymers of 2-phenyl allyl alcohol and styrene as set forth in claim 13 wherein said azo catalyst is alpha, alpha'-azobisisobutyronitrile.

References Cited

UNITED STATES PATENTS

| | | | |
|---|---|---|---|
| 2,563,611 | 8/1951 | Mills et al. | 260—88.1 |
| 2,940,946 | 6/1960 | Shokal et al. | 260—23 |
| 3,299,021 | 1/1967 | Denchfield | 260—88.1 |
| 3,401,213 | 9/1968 | Trementozzi et al. | 260—880 |

OTHER REFERENCES

Alfrey, Bohrer, and Mark. Copolymerization. Interscience Press, New York (1952) pp. 5 and 6.

JOSEPH L. SCHOFER, Primary Examiner

J. C. HAIGHT, Assistant Examiner

U.S. Cl. X.R.

260—80.6, 80.75, 91.3